Oct. 5, 1937.  E. G. LAWRENCE  2,094,610
CORN POPPER
Filed Oct. 2, 1936
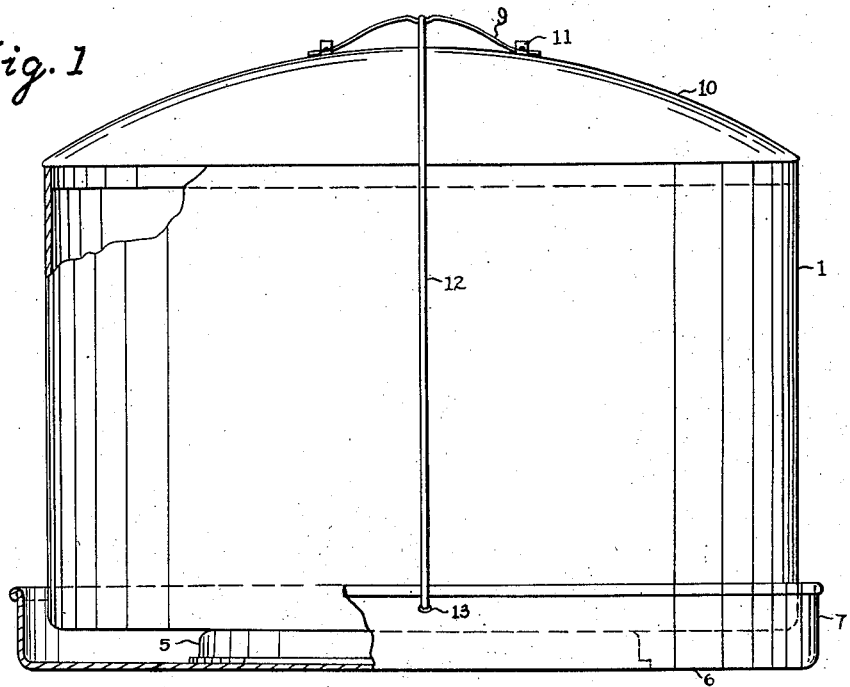
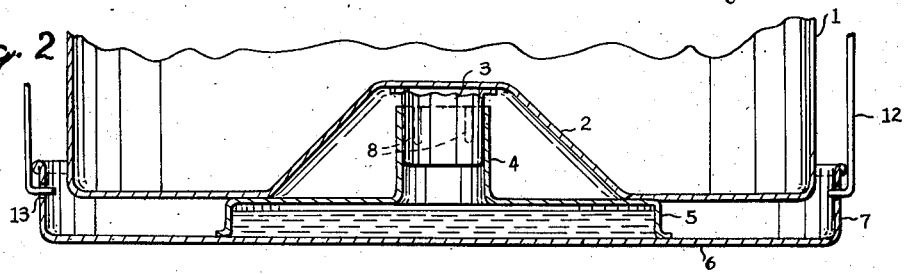
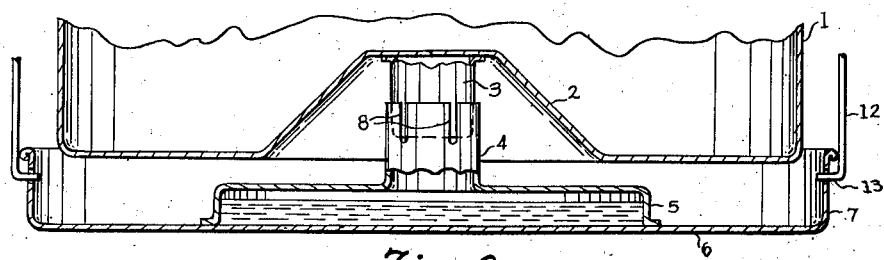
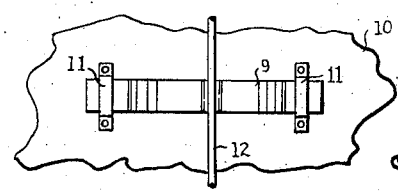
Inventor
E. George Lawrence
By J. C. Murray
Attorney Patented Oct. 5, 1937

2,094,610

UNITED STATES PATENT OFFICE 2,094,610

CORN POPPER

Etna George Lawrence, Highland Park, Mich.

Application October 2, 1936, Serial No. 103,679

11 Claims. (Cl. 53—4)

This invention relates to cooking utensils and particularly to corn poppers.

An object of the invention is to provide for agitation of a cooking vessel, and more specifically a pop corn receptacle, by the generation of steam in a boiler so disposed beneath such vessel as to utilize the heat source which induces a cooking temperature.

Another object is to effect automatic agitation of a cooking vessel by arranging a shallow steam chamber beneath the vessel, and telescopically engaging a cylindrical upward extension from such chamber with a downward extension from the receiver, one of the extensions having ports relieving steam pressure upon a predetermined lifting of the vessel.

A further object is to impose on said vessel a downward spring pressure inducing a rapid lowering of the vessel upon relief of steam pressure in said chamber.

These and various other objects are attained by the construction hereinafter described and illustrated in the accompanying drawing, wherein:

Fig. 1 is a side elevational view of the utensil, with portions broken away to show interior features.

Fig. 2 is a diametrical sectional view of the lower portion of the utensil, showing a normal position of the parts.

Fig. 3 is a view similar to Fig. 2, but showing the vessel in its raised position.

Fig. 4 is a fragmentary top view of the vessel lid, showing the mounting thereon of a leaf spring.

In these views, the reference character 1 designates a cylindrical, open-topped cooking vessel, the central portion of its bottom being upwardly domed as indicated at 2. Centrally secured to the vessel bottom, within its domed portion, is a downwardly projecting cylindrical plunger 3, which slidingly fits within a cylinder 4 rigidly carried by and communicating with a boiler 5, fixed upon a pan 6. Said boiler is a shallow circular chamber underlying the domed portion of the vessel 1 and having a diameter somewhat exceeding that of the dome 2, so that the outer portion of the boiler may normally provide a seat for said vessel. The pan 6 slightly exceeds the vessel 1 in diameter, and has a peripheral wall 7.

Formed in the cylinder 4 are a number of steam outlet ports 8 which are preferably slots, downwardly extending from the upper edge of the cylinder. The arrangement is such that the plunger inder. 3 normally closes such ports and extends a short distance below same, as best appears in Fig. 2.

In use of the utensil, as so far described, the vessel 1 is initially removed from the base jointly formed by the pan 6 and boiler 5 to permit pouring a quantity of water into the boiler through the cylinder 4. The utensil is then positioned on a stove or burner, with the vessel resting on the base and the plunger 3 inserted in the cylinder 4. Heat is thus applied both to the boiler and to the vessel 1 raising the contents of the latter to a cooking temperature. The water in the boiler 5, due to its shallow structure, quickly reaches the boiling point, and steam is delivered to the cylinder 4. Under pressure of such steam, the vessel is raised as indicated in Fig. 3 until the lower ends of the ports 8 are uncovered by the plunger 3. This immediately relieves steam pressure in the cylinder 4, and the vessel descends, of its own weight, to a seat on the boiler 5. There is then promptly again generated sufficient steam to lift the vessel, and the described cycle is repeated. Thus the plunger 3 and cylinder 4 together form an expansible chamber, subjecting the vessel 1 to a constant up-and-down agitation such as is required in various cooking operations and particularly in popping corn.

For some purposes, it may be desirable to effect a more forceful return of the vessel 1 to its seat than results solely from the weight of such vessel. Impetus may be added to such return by compressing a spring through upward actuation of the vessel and supplementing the weight of the vessel by the rebound of such spring. Thus there is shown in Figs. 1 and 4, an upwardly bowed spring 9 formed of strip sheet metal centrally surmounting a lid 10 removably applied to the vessel 1, the end portions of such spring being freely inserted in keepers 11 upstanding upon the lid. Midway of its length, said spring is downwardly indented to accommodate a wire bail 12 pivoted to the side wall of the pan 6 at diametrically opposed points 13 thereof.

The arrangement is such that the bail when swung to its upright position shown in Fig. 1, snaps into the indentation of the spring, and is thus latched in such position. Raising of the vessel 1 tends to flatten out and increasingly stress the spring, which reacts to add impetus to the vessel, in its down travel. The spring further reacts upon the lid, in all positions of the vessel, to hold the lid firmly to its seat.

The described construction serves, at only a slight added cost, to eliminate the work of manually agitating a cooking vessel, and is particularly useful in maintaining the required movement of a corn popper.

It will be noted that the pan 6 serves to catch any water that may escape from the boiler by way of the ports 8 as well as any condensate that may be formed by discharging steam. Also the pan guides discharging steam in such proximity to the vessel 1 as to exercise a heating effect on such vessel.

The invention is presented as including all such modifications and changes as come within the scope of the following claims.

What I claim is:

1. A cooking utensil comprising a cooking vessel, a steam generator adjacent to the bottom of such vessel, and means for receiving steam from the generator and alternately applying the pressure of such steam to move the cooking vessel and relieving such pressure.

2. A cooking utensil comprising a cooking vessel, a boiler beneath the vessel, said vessel having a definite normal position relative to the boiler, a steam chamber jointly carried by the boiler and vessel and communicating with the boiler, and expansible under steam pressure to move the vessel in a desired direction, and having a normally covered port for relieving steam pressure, such port being uncovered upon a predetermined expansion of the chamber, and a spring effective to return the vessel to its normal position.

3. A cooking utensil comprising a base, a cooking vessel surmounting the base, a boiler carried by the base beneath the vessel, and a steam chamber jointly carried by the boiler and the vessel, beneath the vessel, and communicating with the boiler, and upwardly expansible under steam pressure to lift the vessel, and having a normally closed port for relieving steam pressure, said port being uncovered by a predetermined expansion of the chamber.

4. A cooking utensil comprising a base, a cooking vessel surmounting the base, a boiler carried by the base beneath the vessel, a cylinder rising from and communicating with the boiler, and a plunger carried by the vessel, therebeneath, projecting into and forming with the cylinder a steam chamber expansible to lift the vessel, the cylinder being ported to relieve pressure in such chamber upon a predetermined lifting of the plunger and vessel.

5. A cooking utensil comprising a base, an open-topped vessel surmounting the base, a lid removably engaging such vessel, means on the base for periodically lifting the vessel, and means including a member mounted on the base and adjustable to and from a position above the lid, to yieldably hold the lid in place and yieldably resist lifting of the vessel.

6. A cooking vessel as set forth in claim 5, the last mentioned means comprising a spring mounted on the lid and adapted to latch said adjustable member in its position above the lid.

7. A cooking utensil comprising a base, an open-topped vessel surmounting the base, a lid removably engaging such vessel, means on the base for periodically lifting the vessel, and a spring engaged above the lid and reacting between the lid and base to yieldably hold the lid in place and yieldably oppose lifting of the vessel.

8. A cooking utensil comprising an open-topped vessel, a lid removably engaging such vessel, and a spring effective on the vessel through its lid for yieldably resisting lifting of the vessel.

9. A cooking utensil comprising a base, an open-topped vessel surmounting the base, a lid removably engaging such vessel, means carried by the base for periodically lifting the vessel, a bail pivotally engaging the base and adapted in an upright position to arch above the lid, and a spring engaged between the bail and lid in the upright position of the bail, stressed by lifting of the vessel and adding impetus to its lowering.

10. A cooking utensil as set forth in claim 9, said spring being attached to the lid.

11. A cooking utensil as set forth in claim 9, the spring being upwardly bowed, and the bail being engageable in its upright position with the mid portion of the spring, the utensil further comprising a pair of keepers carried by the lid and slidingly accommodating the end portions of the spring.

E. GEORGE LAWRENCE.